(12) United States Patent
Veysoglu et al.

(10) Patent No.: US 9,490,893 B2
(45) Date of Patent: Nov. 8, 2016

(54) INTERFERENCE SUPPRESSION IN A SATELLITE COMMUNICATION SYSTEM USING ONBOARD BEAMFORMING AND GROUND-BASED PROCESSING

(71) Applicant: The Boeing Company, Seal Beach, CA (US)

(72) Inventors: Murat E. Veysoglu, Cypress, CA (US); Lisa Kuo, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 14/163,003

(22) Filed: Jan. 24, 2014

(65) Prior Publication Data
US 2015/0087299 A1   Mar. 26, 2015

Related U.S. Application Data

(60) Provisional application No. 61/882,645, filed on Sep. 26, 2013.

(51) Int. Cl.
*H04B 7/185* (2006.01)
*H04B 7/204* (2006.01)

(52) U.S. Cl.
CPC ...... *H04B 7/18534* (2013.01); *H04B 7/18515* (2013.01); *H04B 7/18517* (2013.01); *H04B 7/18539* (2013.01); *H04B 7/2041* (2013.01)

(58) Field of Classification Search
CPC .......................... H04B 7/18515; H04B 7/2041
See application file for complete search history.

(56) References Cited

U.S. PATENT DOCUMENTS

| 4,672,378 A | 6/1987 | Drabowitch et al. |
| 5,343,211 A | 8/1994 | Kott |

(Continued)

FOREIGN PATENT DOCUMENTS

| WO | WO02-07257 A1 | 1/2002 |
| WO | 2006/073893 A2 | 7/2006 |
| WO | 2010/055090 A2 | 5/2010 |

OTHER PUBLICATIONS

European Search Report dated Mar. 16, 2015 for Application No. 14186244.1-1855.

(Continued)

*Primary Examiner* — Bobbak Safaipour
*Assistant Examiner* — Devan Sandiford
(74) *Attorney, Agent, or Firm* — Womble Carlyle Sandridge & Rice LLP

(57) ABSTRACT

A satellite is configured to communicate with a ground base station to provide coverage for communication in a first geographic region, and suppress from the communication, interference from a second geographic region. The satellite includes an onboard beamformer (OBBF), feed array and feeder-link antenna. The OBBF is configured to produce first and second spot beams for respective ones of the first and second geographic regions. The feed array is configured to receive first and second signals in respective ones of the first and second spot beams for respective geographic regions. At least portions of the first and second signals carry respective ones of the communication and the interference. The feeder-link antenna, then, is configured to transmit the first signals and second signals to the ground base station that is configured to suppress any of the interference from at least the portion of the first signals carrying the communication.

21 Claims, 4 Drawing Sheets

(56) References Cited

U.S. PATENT DOCUMENTS

| | | |
|---|---|---|
| 6,275,188 B1 | 8/2001 | Chen |
| 6,556,809 B1* | 4/2003 | Gross .................. H04B 7/18532 |
| | | 455/12.1 |
| 7,813,700 B2 | 10/2010 | Zheng et al. |
| 8,115,679 B2 | 2/2012 | Falk |
| 8,299,955 B2 | 10/2012 | Fuss et al. |
| 8,339,308 B2 | 12/2012 | Churan |
| 2003/0054814 A1* | 3/2003 | Karabinis et al. ............ 455/427 |
| 2003/0068978 A1* | 4/2003 | Karabinis et al. ........... 455/12.1 |
| 2003/0073436 A1* | 4/2003 | Karabinis et al. ............ 455/429 |
| 2005/0037749 A1* | 2/2005 | Karabinis ............. H04B 7/1851 |
| | | 455/427 |
| 2005/0136836 A1* | 6/2005 | Karabinis ............. H04B 7/1851 |
| | | 455/12.1 |
| 2005/0197060 A1* | 9/2005 | Hedinger ............. H04B 7/2041 |
| | | 455/12.1 |
| 2005/0245192 A1* | 11/2005 | Karabinis .............. H04B 1/006 |
| | | 455/12.1 |
| 2005/0260947 A1* | 11/2005 | Karabinis et al. ........... 455/12.1 |
| 2005/0282542 A1* | 12/2005 | Karabinis ..................... 455/429 |
| 2006/0094352 A1* | 5/2006 | Karabinis .......... H04B 7/18543 |
| | | 455/13.4 |
| 2006/0211419 A1 | 9/2006 | Karabinis |
| 2007/0135051 A1* | 6/2007 | Zheng et al. ................. 455/63.1 |
| 2007/0281612 A1 | 12/2007 | Benjamin et al. |
| 2009/0231187 A1* | 9/2009 | Churan ......................... 342/352 |
| 2013/0070677 A1* | 3/2013 | Chang .......................... 370/328 |
| 2014/0241239 A1* | 8/2014 | Chang .......................... 370/316 |

OTHER PUBLICATIONS

Haynes, "A Primer on Digital Beamforming," Mar. 26, 1998, Spectrum Signal Processing, 15 pages.

* cited by examiner

INTERFERENCE SUPPRESSION IN A SATELLITE COMMUNICATION SYSTEM USING ONBOARD BEAMFORMING AND GROUND-BASED PROCESSING

CROSS-REFERENCE TO RELATED APPLICATION(S)

The present application claims priority to U.S. Provisional Patent Application No. 61/882,645, entitled: Interference Suppression in a Satellite Communication System using Onboard Beamforming and Ground-Based Processing, filed on Sep. 26, 2013, the content of which is incorporated herein by reference in its entirety.

TECHNOLOGICAL FIELD

The present disclosure relates generally to satellite communication systems and, in particular, to interference suppression in a satellite communication system.

BACKGROUND

Wireless communications access, on which our society and economy is growing increasingly dependent, is becoming pervasive in all aspects of daily societal functions. For example, wireless communication has become increasingly available to users on board mobile platforms such as land vehicles, aircraft, spacecraft, watercraft or the like. Wireless communication services for passengers of mobile platforms include Internet access, e.g., e-mail and web browsing, live television, voice services, virtual private network access and other interactive and real time services.

Wireless communication platforms for remote, hard to access, or mobile user terminals, e.g., mobile platforms, often use communication satellites that can provide service coverage over large geographic footprints, often including remote land-based or water-based regions. Generally, base stations (e.g., ground base stations) send information (e.g., data) to the user terminals through a bent pipe via one or more satellites. More specifically, the base stations send information on a forward link to the satellite that receives, amplifies and re-transmits the information to an antenna of one or more fixed or mobile user terminals. The user terminals, in turn, can send data back to the base stations via the satellite. The base stations can provide the user terminals with links to the Internet, public switched telephone networks, and/or other public or private networks, servers and services.

Modern satellites and other cellular communication systems often employ a number of spot beams providing a beam laydown that forms coverage over a geographic region that may be divided into a plurality of cells. In a communication system using spot beams, the same frequency may be used at the same time in two or more cells. These beams may be configured to maintain a predetermined co-polar isolation (e.g., carrier-to-interference ratio) value in order to minimize the interference among beams. This is called spatial isolation and spatial reuse. In one typical parlance, each spot beam may be assigned a color to create a color pattern that matches a frequency reuse pattern. Identical frequencies, then, may be reused by different beams with the same color.

A number of systems use beamforming antennas to suppress interference by employing beam designs with low sidelobes or adaptive beamforming techniques. For these systems, the beamformer may be implemented onboard the satellite (sometimes referred to as an onboard beamformer—OBBF) or on the ground (sometimes referred to as a ground-based beamformer—GBBF). There are important differences between systems that employ one of these techniques. An OBBF may be constrained by size and power dissipation requirements of the satellite, which may make it difficult to implement sophisticated beamforming algorithms. A GBBF on the other hand may not have similar size and power constraints, and may therefore be capable of implementing sophisticated beamforming algorithms, such as those that include adaptive interference cancellation schemes. But GBBF-based systems require much higher feeder bandwidth, which may render them infeasible in some situations.

The performance requirements of a system often assume that the satellite's deployed reflector antenna has an ideal surface (ideally-shaped). But the larger surfaces of some reflectors and their deployment often create distortion that results in a non-ideal surface (non-ideally-shaped). And when the surface deviates from its ideal shape, performance may degrade. Likewise, thermal effects may degrade performance. Adaptive beamforming techniques may reduce the impact of a non-ideally-shaped reflector and thermal effects. But this is currently limited to GBBF-based systems and may at least partially explain why these systems are often more desirable than OBBF-based systems for the purpose of interference suppression.

BRIEF SUMMARY

Example implementations of the present disclosure are generally directed to a system and an associated method of suppressing interference in a satellite communication system using onboard beamforming and ground-based processing. Example implementations utilize an onboard beamformer (OBBF) in conjunction with ground-based signal processing to combat interference, even in the presence of unknown reflector distortions. Example implementations may have a significantly-reduced feeder-link bandwidth requirement as compared to ground-based-beamformer-based (GBBF-based) systems.

A satellite communication system may include a satellite and ground base station configured to provide coverage for communication in a first geographic region, and suppress from the communication, interference from a distinct, second geographic region that is outside the first geographic region. According to one aspect of example implementations, the satellite is provided and includes an onboard beamformer (OBBF), feed array and feeder-link antenna. The OBBF is configured to produce a plurality of spot beams including first spot beams for the first geographic region, and separate, second spot beams for the second geographic region. The feed array is configured to receive first signals in the first spot beams for the first geographic region, and second signals in the second spot beams for the second geographic region. At least a portion of the first signals carry the communication, and at least a portion of the second signals carry the interference. The feeder-link antenna, then, is configured to transmit the first signals and second signals to the ground base station that is configured to process the first signals and second signals, and based thereon, suppress any of the interference from at least the portion of the first signals carrying the communication.

In one example, the feed array being configured to receive first signals may include being configured to receive a first portion of the first signals carrying the communication and another, second portion of the first signals in which the communication is absent. In this example, the feeder-link antenna being configured to transmit the first signals may include being configured to transmit the first portion and second portion of the first signals, the ground base station being configured to process the second portion of the first signals and the second signals, and based thereon, suppress any of the interference from the first portion of the first signals.

In a further example, the feed array being configured to receive the second portion of the first signals may include being configured to receive the second portion of the first signals during a scheduled, periodic time of a known duration in which the communication in the first geographic region is absent. Also in a further example, the feed array may be configured to receive the second portion of the first signals in an allocated portion of a frequency band during a scheduled time of a known duration in which the communication in the first geographic region is absent.

In one example, the feeder-link antenna being configured to transmit the first signals and second signals may include being configured to transmit the first signals and second signals to the ground base station that is configured to calculate one or more beam weights based on the first signals and second signals, and apply the beam weights to at least the portion of the first signals carrying the communication.

According to another aspect of example implementations, the ground base station is provided and includes radio-frequency equipment and a signal processor coupled to the radio-frequency equipment. The radio-frequency equipment is configured to receive first signals and separate, second signals from the satellite including an onboard beamformer such as that described above. The signal processor, then, may be configured to process the first signals and second signals, and based thereon, suppress any of the interference from at least the portion of the first signals carrying the communication.

In one example, the radio-frequency equipment being configured to receive first signals may include being configured to receive a first portion of the first signals carrying the communication and another, second portion of the first signals in which the communication is absent. In this example, the signal processor being configured to process the first signals and second signals may include being configured to process the second portion of the first signals and the second signals, and based thereon, suppress any of the interference from the first portion of the first signals.

In a further example, the radio-frequency equipment being configured to receive the second portion of the first signals may include being configured to receive the second portion of the first signals during a scheduled, periodic time of a known duration in which the communication in the first geographic region is absent. Also in a further example, the radio-frequency equipment being configured to receive the second portion of the first signals may include being configured to receive the second portion of the first signals in an allocated portion of a frequency band during a scheduled time of a known duration in which the communication in the first geographic region is absent.

In one example, the signal processor may include a beam-weight generator and beamformer. The beam-weight generator may be configured to calculate one or more beam weights based on the first signals and second signals. And the beamformer may be configured to apply the beam weights to at least the portion of the first signals carrying the communication.

In other aspects of example implementations, methods are provided for providing coverage for communication the first geographic region, and suppress from the communication, interference from the second geographic region. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
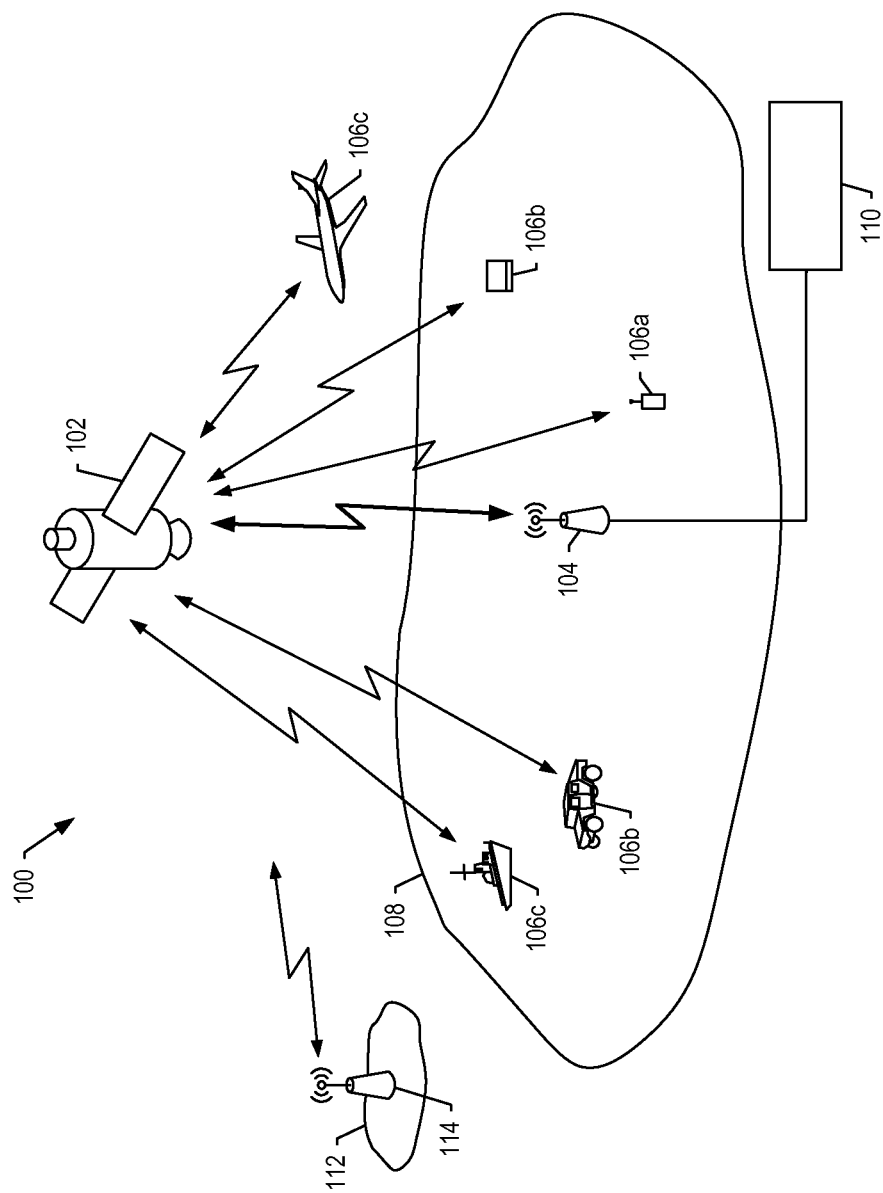
FIG. 1 illustrates a satellite communication system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to dimensions of or relationships between components. Those and other similar relationships may be absolute or approximate to account for variations that may occur, such as those due to engineering tolerances or the like. Like reference numerals refer to like elements throughout.

The present disclosure relates to interference suppression in a satellite communication system. As described herein, the term "satellite" may be used without loss of generality and include other types of relay and distribution apparatuses, which in various examples may be located on land or onboard a mobile platform (e.g., land vehicle, aircraft, spacecraft, watercraft). Thus, although the communications system of example implementations may be shown and described as including one or more "satellites," the term may be used more broadly to include one or more relay and distribution apparatuses.

FIG. 1 illustrates one example of a satellite communication system 100 in accordance with various example implementations of the present disclosure. As shown, the satellite communication system may include one or more satellites 102, one or more satellite ground base stations 104 and a plurality of user terminals 106. The user terminals may be of a variety of different types such as small-sized handheld terminals 106a, mid-sized portable and vehicular terminals 106b, and/or large-sized aeronautical and maritime terminals 106c. The satellite may be configured to communicate with the base station to provide coverage for communication in a geographic region 108 (at times the "coverage region") in which the base station and one or more user terminals may be located. The base station may be coupled to or otherwise part of one or more networks 110, such as the Internet, public switched telephone networks (PSTN), packet data networks (PDN), public land mobile networks (PLMN), private networks such as corporate and government networks, and/or other servers and services.

In various examples, the satellite 102 and base station 104 may enable communication between user terminals 106 and the network 110. In this regard, the base station may receive information (e.g., data) from the network, and communicate the information to the satellite. The satellite may in turn transmit or relay the information to one or more user terminals in spot beams. Conversely, for example, the satellite may receive information from a user terminal, and communicate the information to the base station, which may in turn transmit or relay the information to the network. This type of communication may at times be referred to as "bent-pipe" communication. It should be understood, however, that example implementations may also be applicable to other types of satellite systems, such as those with on-board packet switching.

The satellite 102 of the satellite communication system 100 may employ a number of spot beams providing a beam laydown for the coverage region 108. The beam laydown may be divided into a plurality of cells, and its beams may cover respective cells. Each beam may be assigned some beam indicia to create a pattern that matches a frequency reuse pattern for the satellite. In some examples, the beam indicia may be colors or cells, or may be alpha, numeric or alpha-numeric characters. In accordance with example implementations of the present disclosure, the satellite may use same frequency at the same time for two or more cells. That is, the satellite may reuse same frequency in different beams with the same color. In one example, the reuse distance may be measured from the center of one beam to the edge of another beam with the same color.

In various instances, signals received by the satellite in various spot beams may be subjected to interference from a distinct, second geographic region 112 (at times the "interference region") that is outside the coverage region 108, and within which the interference may originate from some source 114. As explained in the background section, a number of modern cellular communication systems use beamforming antennas to suppress interference by employing beam designs with low sidelobes or adaptive beamforming techniques. To implement adaptive beamforming, these systems often employ an onboard beamformer (OBBF) or ground-based beamformer (GBBF). Each of these types of beamformers has benefits, as well as drawbacks. The cellular communication system 100 of example implementations of the present disclosure may employ techniques for interference suppression that use onboard beamforming and ground-based processing, and may thereby realize benefits of both OBBF-based systems and GBBF-based systems without (or with a reduction in) their drawbacks.

To enable the interference suppression of example implementations, the satellite 102 may include an OBBF configured to produce a plurality of spot beams including first spot beams (at times "communication beams") for the coverage region 108, and separate, second spot beams (at times "auxiliary beams") for the interference region 112. The satellite may receive first signals (at times "communication signals") in the communication beams for the coverage region, and second signals (at times "auxiliary signals") in the auxiliary beams for the interference region. At least a portion of the communication signals may carry the communication, and at least a portion of the auxiliary signals may carry the interference. The satellite may transmit the communication and auxiliary signals to the base station 104, which may be configured to then suppress any of the interference from at least the portion of the communication signals carrying the communication.

Figure 2:
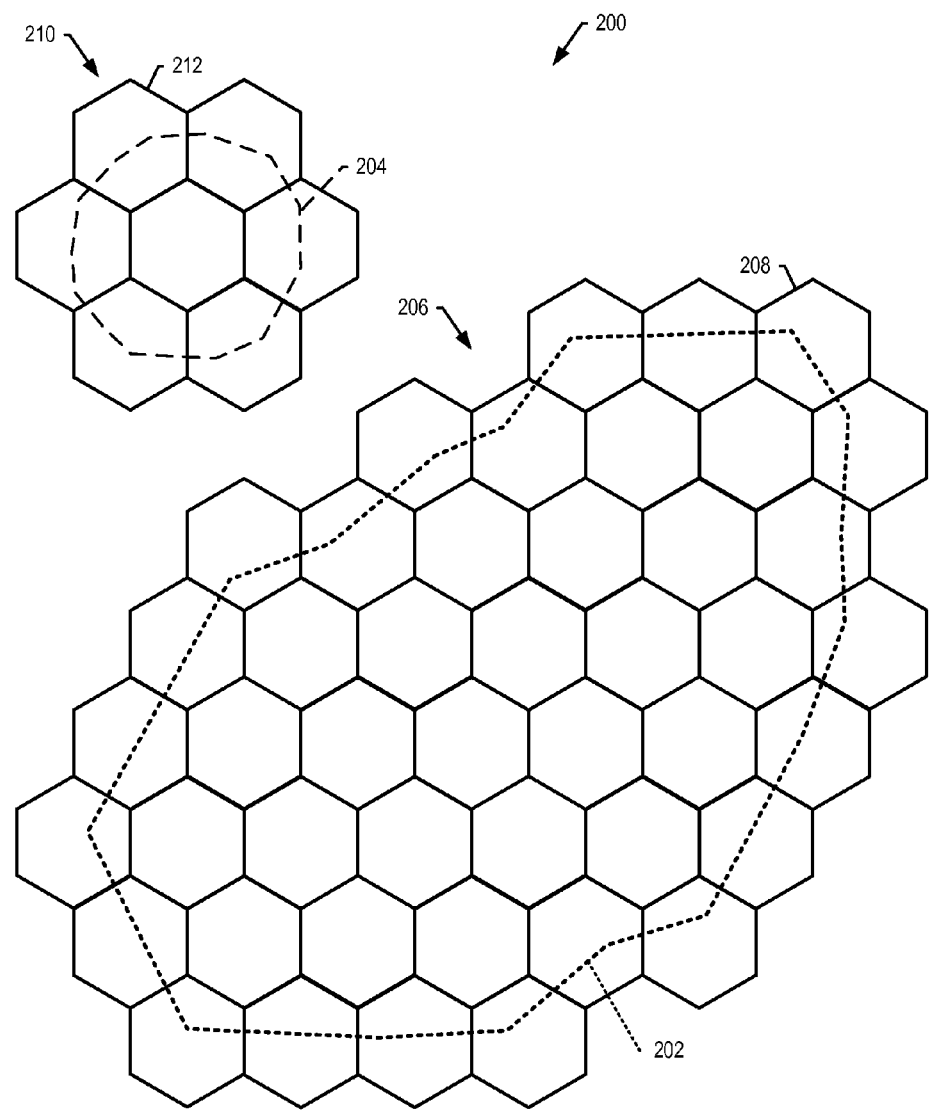
FIG. 2 illustrates a geographic area including beam lay-downs for respective, separate coverage and interference regions, in accordance with one example implementation of the present disclosure.

FIG. 2 illustrates a geographic area 200 including a coverage region 202 (e.g., coverage region 108) and a distinct, interference region 204 (e.g., interference region 112) that is outside the coverage region. The satellite of example implementations may include an OBBF configured to produce communication beams that provide a first beam laydown 206 for the coverage region, and which laydown may be divided into a plurality of first cells 208. Likewise, the OBBF may be configured to produce auxiliary beams that provide a second beam laydown 210 for the interference region, and which laydown may be divided into a plurality of second cells 212. The satellite may receive communication signals in a first frequency band according to which the communication beams may be arranged in some frequency reuse pattern. The satellite may also receive auxiliary signals in a second frequency band according to which the auxiliary beams may be arranged in some frequency reuse pattern. In some examples, the second frequency band may be a subset or more of the first frequency band, and may depend on the relative sizes of the interference region and coverage region, and numbers of cells required to cover each.

Figure 3:
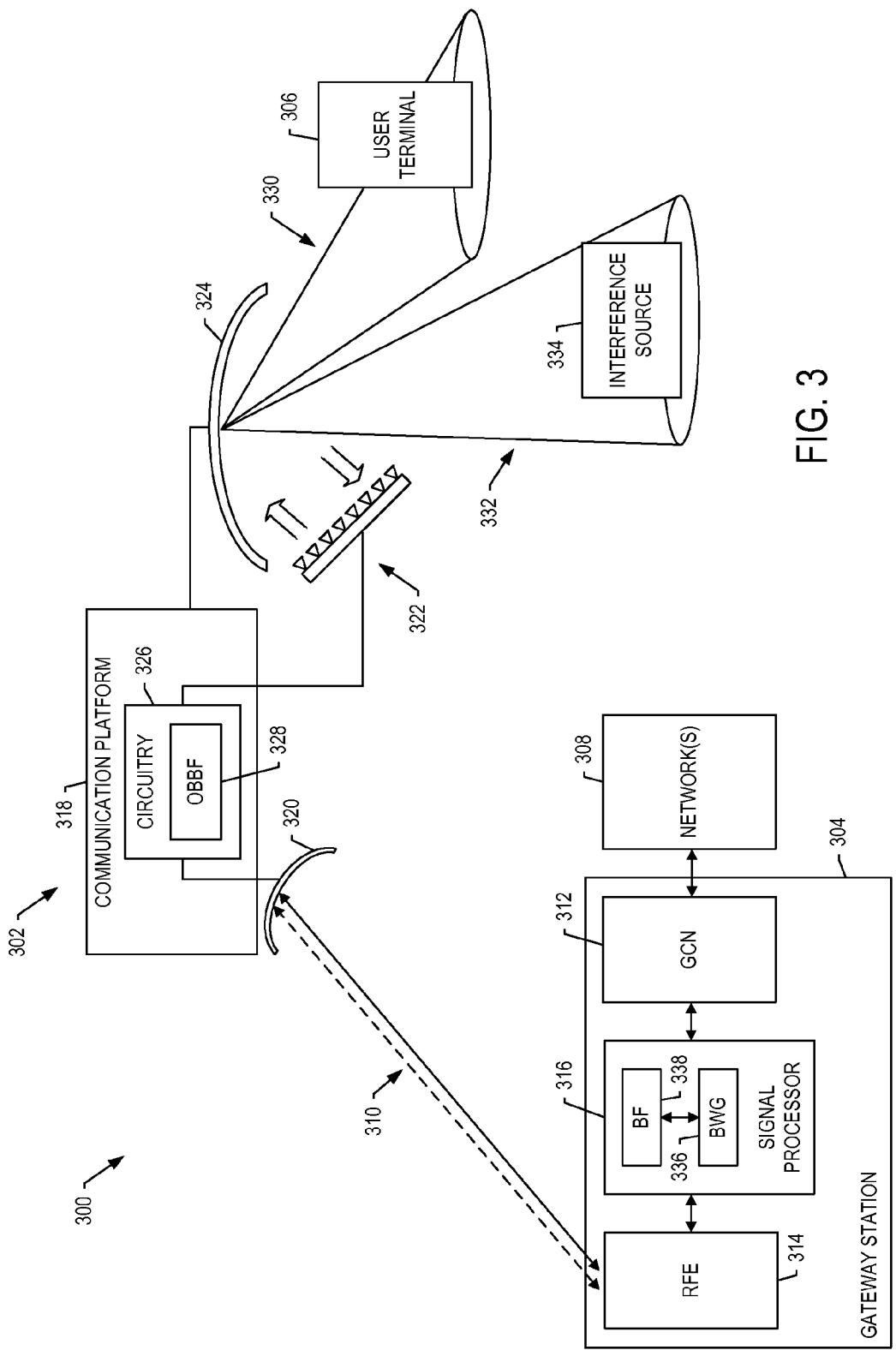
FIG. 3 is a schematic block diagram of a satellite communication systems according to example implementations of the present disclosure.

FIG. 3 more particularly illustrates a satellite communication system 300 that in one example may correspond to the satellite communication system 100 of FIG. 1. As shown, the satellite communication system may include one or more satellites 302, one or more satellite ground base or gateway stations 304 and a plurality of user terminals 306, which in one example may correspond to respective ones of satellite 102, ground base station 104 and user terminals 106. The gateway station may receive information (e.g., data) from one or more networks 308 (e.g., network 110), and communicate the information to the satellite over one or more feeder links 310 in a predetermined frequency band (e.g., Ku-band), and vice versa. As shown, the gateway station may include a ground control network (GCN) 312 that may include, for example, a satellite base sub-system (SBSS) and core network (CN) configured to enable communication with the network. The gateway station may further include radio-frequency (RF) equipment (RFE) 314 and, as explained below, a ground-based signal processor 316 configured to suppress interference in desired communication signals from the satellite.

The satellite 302 may transmit or relay information from the gateway station 304 to one or more user terminals 306, and vice versa. The satellite may include a communication platform 318 or payload that carries a feeder-link antenna 320 at which the satellite may receive signals from the gateway station 304, and from which the satellite may transmit signals to the gateway station, over the feeder links 310. Likewise, the communication platform may carry an antenna system including an array of antenna feed elements 322, and optionally a phased array or reflector 324 for communication with one or more user terminals.

The reflector 324 may be a single reflector or multiple reflectors, and may be of any appropriate size having a parabolic or other appropriate surface. In various examples, the reflector may be large, such as on the magnitude of 22 meters in diameter, which may enable formation of narrower spot beams and maximum frequency reuse. In one example, the reflector may have a surface formed from a mesh material, and may be pulled outward from a stowed configuration to a deployed configuration in which its surface may form a parabola. In some instances, this deployment maybe driven by individually-commandable drive motors located at corner hinges, which may supply torque required to pull tethers to deploy the reflector.

The communication platform 318 may include appropriate circuitry 326 between the feeder-link antenna 320 and feed array 322, and configured to process signals transmitted or received by the satellite 302. This circuitry may include an OBBF 328 configured to produce spot beams in which the feed array may transmit or receive signals over one or more user links in a predetermined frequency band (e.g., L-band). In some examples, the circuitry may include a single OBBF configured to produce beams for both the forward direction (for transmission of signals), and beams in the return direction (for reception of signals). In other examples, the circuitry may include a separate OBBFs configured to produce beams for each of the forward direction and return direction.

As indicated above, the spot beams may provide one or more beam laydowns each of which may be divided into a plurality of cells. More particularly, the spot beams may include communication beams 330 for a first beam laydown for a coverage region within which the user terminal(s) 306 may be located. The spot beams may also include auxiliary beams 332 for a second beam laydown for an interference region within which one or more sources of interference 334 (e.g., source 114) may be located.

The OBBF 328 being configured to produce the spot beams may include it being configured to adjust the amplitude and phase of each path to each feed element of the array 322 according to one or more beam coefficients, beam weights or the like (generally "beam weights"). The paths to the feed elements may at times be referred to herein as "element paths," and the OBBF may therefore produce beams that may be output to the feed elements via respective ports (sometimes referred to as "beamports") of the OBBF.

In various examples, the beam weights may be generated and loaded onto or otherwise received by the OBBF 328. The beam weights may be generated in a number of different manners. In one example, the beam weights may be generated by a computing apparatus such as a beam-weight generator (BWG), or offline by another computing apparatus and loaded into the BWG from which the beam weights may be loaded onto the OBBF. The OBBF may use the beam weights to form beams corresponding to respective cells, and output the beams to the feed elements 322 via respective beamports.

In addition to the OBBF 328, the circuitry 326 of the communication platform 318 may also include circuitry configured to amplify, up-convert, down-convert and/or route signals between the feeder-link antenna 320 and feed elements 322. For example, the circuitry may include one or more channelizers (e.g., forward and return channelizers) configured to route signals between the feeder-link-band (e.g., Ku-band) signals and user-link-band (e.g., L-band) signals. The circuitry may include a hybrid matrix configured to distribute the signals to forward ones of the feed elements according to a hybrid-matrix-to-combiner transform. And in some examples, the circuitry may include circuitry configured to apply an antenna gain to "close" the user link with a user terminal 306.

In the return direction in particular, in some examples, communication signals from a user terminal 306 and auxiliary signals from an interference source 334 may be received at the satellite 302, and may be reflected off the reflector 324 and received by return ones of the feed elements 322. The communication and auxiliary signals may be amplified and down-converted and routed to the OBBF 328, which may be configured to produce communication beams 330 and auxiliary beams 332, respectively, for reception of the communication and auxiliary signals. In this regard, the OBBF may apply appropriate beam weight or set of beam weights to strengthen the communication and auxiliary signals. The communication and auxiliary signals may then be passed through the channelizer to route signals between the user-link-band signals and feeder-link-band signals. The communication and auxiliary signals may be up-converted and transmitted to the gateway station 304 via the feeder-link antenna 320 in feeder links 310.

At the gateway station, the communication and auxiliary signals may be received by the signal processor 316 via the RFE 314. The signal processor may be configured to process the communication and auxiliary signals, and based thereon, suppress any interference (from the interference source 334) from at least the portion of the communication signals carrying communication from the user terminal 306. In some examples, the signal processor may include a BWG 336 and beamformer (BF) 338 to process the communication and auxiliary signals, and suppress interference from the communication signals, such as in accordance with any of a number of different adaptive beamforming techniques. In this regard, the BWG may be configured to calculate one or more beam weights based on the communication and auxiliary signals, and the beamformer may be configured to apply the beam weights to at least the portion of the communication signals carrying the communication. The communication signals may then continue from the GCN 312 to the network 308 for processing and routing.

The signal processing performed by the signal processor 316 may be adaptive in nature in that it may utilize auxiliary signals from auxiliary beams 332 to perform the interference cancellation. Consequently, any distortions associated with the reflector 324 may be compensated for by the signal processing, which may result in increased interference suppression performance compared to a system that uses a fixed GBBF approach.

In some examples, it may be desirable to perform the signal processing for interference suppression using communication signals (signals from communication beams 330) in which communication is absent. In some examples, then, the communication signals may be designed to include a first portion that carries the communication, and another, second portion that in which the communication is absent. This may be accomplished in any of a number of different manners, such as those in which user terminals may be configured to cease communication for some period of time and/or frequency band (communication thereby being absent), while the satellite 302 continues to receive communication signals in respective communication beams 330—these signals composing the second portion. For example, the user terminals 306 may be configured to cease communication (communication thereby being absent) in the return direction during a scheduled, periodic time of a known duration, such as during some allocated time slot. In another example, the user terminals may be configured to cease communication in the return direction in an allocated portion of a frequency band during a scheduled time of a known duration. In these and other similar instances, the signal processor 316 may process the second portion of the communication signals and the auxiliary signals (e.g., calculate beam weights based on the second portion of the communication signals and auxiliary signals), and based thereon, suppress any of the interference from the first portion of the communication signals that carry the communication (e.g., apply the calculated beam weights to the first portion of the communication signals).

In the forward direction, signals from the network 308 may be sent to a beamformer (separate from or part of the signal processor 316) via the GCN 312. The beamformer may apply appropriate beam weight or set of beam weights to the signals, which in some examples may be calculated based on those calculated by the BWG 336 for the return direction. This may result in several signals intended for respective forward ones of the feed elements 322 of the communication platform 318 of the satellite 302. The beamformer may then forward the signals to the satellite via the RFE 314. The satellite may then provide the signals to the appropriate user terminal 306 in a communication beam 330 in the coverage region. In one example, the satellite may receive the signals over feeder links 310 at the feeder-link antenna 320, amplify, down-convert and route the signals to the forward feed elements through appropriate circuitry 326. And from the forward feed elements, the signals may radiate off the reflector 324 toward a cell in the coverage region where the signals may be received by the user terminal.

Figure 4:
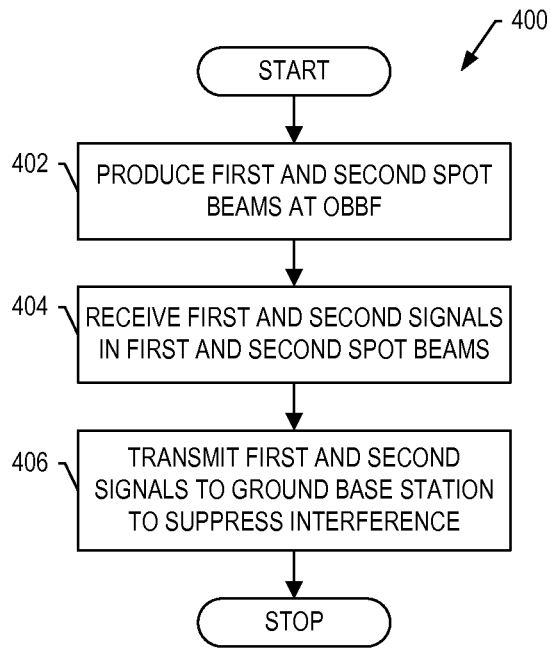
FIGS. 4 and 5 illustrate flowcharts including various operations in respective methods according to aspects of example implementations of the present disclosure.
Figure 5:
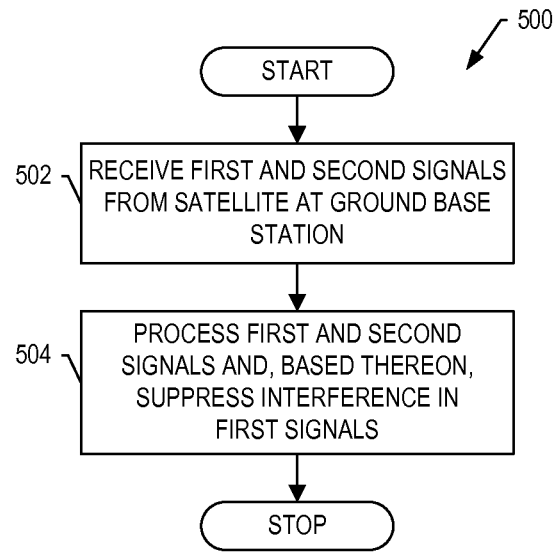

FIGS. 4 and 5 illustrate flowcharts including various operations in respective methods 400, 500 of providing coverage for communication in a first geographic region (e.g., coverage region 108, 202), and suppressing from the communication, interference from a distinct, second geographic region (e.g., interference region 112, 204) that is outside the first geographic region, according to aspects of example implementations of the present disclosure.

Referring first to FIG. 4, as shown in block 402, the method of one aspect includes producing at an OBBF (e.g., OBBF 328) of a satellite (e.g., satellite 102, 302), a plurality of spot beams including first spot beams (communication beams) for the first geographic region, and separate, second spot beams (auxiliary beams) for the second geographic region. The method includes receiving at the satellite, first signals (communication signals) in the first spot beams for the first geographic region, and second signals (auxiliary signals) in the second spot beams for the second geographic region, as shown at block 404. At least a portion of the first signals may carry the communication, and at least a portion of the second signals may carry the interference. As shown at block 406, then, the method includes transmitting the first signals and second signals from the satellite to a ground base station (e.g., ground base or gateway station 104, 304) that is configured to suppress any of the interference from at least the portion of the first signals carrying the communication.

Referring now to FIG. 5, as shown in block 502, the method of another aspect includes receiving at a ground base station (e.g., ground base or gateway station 104, 304), first signals and separate, second signals from a satellite (e.g., satellite 102, 302) including an onboard beamformer (e.g., OBBF 328) configured to produce a plurality of spot beams including first spot beams for the first geographic region, and second spot beams for the second geographic region. Similar to before, the satellite may be configured to receive the first signals in the first spot beams for the first geographic region, and the second signals in the second spot beams for the second geographic region, with at least a portion of the first signals carrying the communication, and at least a portion of the second signals carrying the interference. As shown at block 504, then, the method may include suppressing at the ground base station, any of the interference from at least the portion of the first signals carrying the communication.

Many modifications and other implementations of the disclosure set forth herein will come to mind to one skilled in the art to which this disclosure pertains having the benefit of the teachings presented in the foregoing description and the associated drawings. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A satellite configured to communicate with a ground base station to provide coverage for communication in a satellite footprint defined by a first geographic region, and suppress from the communication, interference from a distinct, second geographic region that is outside the satellite footprint defined by the first geographic region, the satellite comprising: an onboard beamformer configured to produce a plurality of spot beams including first spot beams for the first geographic region, and separate, second spot beams for the second geographic region; a feed array configured to receive first signals in the first spot beams for the first geographic region, and second signals in the second spot beams for the second geographic region, at least a portion of the first signals carrying the communication, and at least a portion of the second signals carrying the interference; and a feeder-link antenna configured to transmit the first signals and second signals to the ground base station that is configured to process the first signals and second signals, and based thereon, suppress any of the interference from at least the portion of the first signals carrying the communication.

2. The satellite of claim 1, wherein the feed array being configured to receive first signals includes being configured to receive a first portion of the first signals carrying the communication and another, second portion of the first signals in which the communication is absent, and wherein the feeder-link antenna being configured to transmit the first signals includes being configured to transmit the first portion and second portion of the first signals, the ground base station being configured to process the second portion of the first signals and the second signals, and based thereon, suppress any of the interference from the first portion of the first signals.

3. The satellite of claim 2, wherein the feed array being configured to receive the second portion of the first signals includes being configured to receive the second portion of the first signals during a scheduled, periodic time of a known duration in which the communication in the first geographic region is absent.

4. The satellite of claim 2, wherein the feed array being configured to receive the second portion of the first signals includes being configured to receive the second portion of the first signals in an allocated portion of a frequency band during a scheduled time of a known duration in which the communication in the first geographic region is absent.

5. The satellite of claim 1, wherein the feeder-link antenna being configured to transmit the first signals and second signals includes being configured to transmit the first signals and second signals to the ground base station that is configured to:
  calculate one or more beam weights based on the first signals and second signals; and
  apply the beam weights to at least the portion of the first signals carrying the communication.

6. A ground base station configured to communicate with a satellite to provide coverage for communication in a satellite footprint defined by a first geographic region, and suppress from the communication, interference from a distinct, second geographic region that is outside the satellite footprint defined by the first geographic region, the ground base station comprising: radio-frequency equipment configured to receive first signals and separate, second signals from the satellite including an onboard beamformer configured to produce a plurality of spot beams including first spot beams for the first geographic region, and second spot beams for the second geographic region, the satellite being configured to receive the first signals in the first spot beams for the first geographic region, and the second signals in the second spot beams for the second geographic region, at least a portion of the first signals carrying the communication, and at least a portion of the second signals carrying the interference; and a signal processor coupled to the radio-frequency equipment and configured to process the first signals and second signals, and based thereon, suppress any of the interference from at least the portion of the first signals carrying the communication.

7. The ground base station of claim 6, wherein the radio-frequency equipment being configured to receive first signals includes being configured to receive a first portion of the first signals carrying the communication and another, second portion of the first signals in which the communication is absent, and
  wherein the signal processor being configured to process the first signals and second signals includes being configured to process the second portion of the first signals and the second signals, and based thereon, suppress any of the interference from the first portion of the first signals.

8. The ground base station of claim 7, wherein the radio-frequency equipment being configured to receive the second portion of the first signals includes being configured to receive the second portion of the first signals during a scheduled, periodic time of a known duration in which the communication in the first geographic region is absent.

9. The ground base station of claim 7, wherein the radio-frequency equipment being configured to receive the second portion of the first signals includes being configured to receive the second portion of the first signals in an allocated portion of a frequency band during a scheduled time of a known duration in which the communication in the first geographic region is absent.

10. The ground base station of claim 6, wherein the signal processor comprises:
  a beam-weight generator configured to calculate one or more beam weights based on the first signals and second signals; and
  a beamformer configured to apply the beam weights to at least the portion of the first signals carrying the communication.

11. A method of providing coverage for communication in a satellite footprint defined by a first geographic region, and suppressing from the communication, interference from a distinct, second geographic region that is outside the satellite footprint defined by the first geographic region, the method comprising: producing at an onboard beamformer of a satellite, a plurality of spot beams including first spot beams for the first geographic region, and separate, second spot beams for the second geographic region; receiving at the satellite, first signals in the first spot beams for the first geographic region, and second signals in the second spot beams for the second geographic region, at least a portion of the first signals carrying the communication, and at least a portion of the second signals carrying the interference; and transmitting the first signals and second signals from the satellite to a ground base station that is configured to process the first signals and second signals, and based thereon, suppress any of the interference from at least the portion of the first signals carrying the communication.

12. The method of claim 11, wherein receiving first signals includes receiving a first portion of the first signals carrying the communication and another, second portion of the first signals in which the communication is absent, and
  wherein transmitting the first signals includes transmitting the first portion and second portion of the first signals, the ground base station being configured to process the second portion of the first signals and the second signals, and based thereon, suppress any of the interference from the first portion of the first signals.

13. The method of claim 12, wherein receiving the second portion of the first signals includes receiving the second portion of the first signals during a scheduled, periodic time of a known duration in which the communication in the first geographic region is absent.

14. The method of claim 12, wherein receiving the second portion of the first signals includes receiving the second portion of the first signals in an allocated portion of a frequency band during a scheduled time of a known duration in which the communication in the first geographic region is absent.

15. The method of claim 11, wherein transmitting the first signals and second signals includes transmitting the first signals and second signals to the ground base station that is configured to:
  calculate one or more beam weights based on the first signals and second signals; and
  apply the beam weights to at least the portion of the first signals carrying the communication.

16. A method of providing coverage for communication in a satellite footprint defined by a first geographic region, and suppressing from the communication, interference from a distinct, second geographic region that is outside the satellite footprint defined by the first geographic region, the method comprising: receiving at a ground base station, first signals and separate, second signals from a satellite including an onboard beamformer configured to produce a plurality of spot beams including first spot beams for the first geographic region, and second spot beams for the second geographic region, the satellite being configured to receive the first signals in the first spot beams for the first geographic region, and the second signals in the second spot beams for the second geographic region, at least a portion of the first signals carrying the communication, and at least a portion of the second signals carrying the interference; and processing the first signals and second signals, and based thereon, suppressing at the ground base station, any of the interference from at least the portion of the first signals carrying the communication.

17. The method of claim 16, wherein receiving first signals includes receiving a first portion of the first signals carrying the communication and another, second portion of the first signals in which the communication is absent, and wherein processing the first signals and second signals includes processing the second portion of the first signals and the second signals, and based thereon, suppressing any of the interference from the first portion of the first signals.

18. The method of claim 17, wherein receiving the second portion of the first signals includes receiving the second portion of the first signals during a scheduled, periodic time of a known duration in which the communication in the first geographic region is absent.

19. The method of claim 17, wherein receiving the second portion of the first signals includes receiving the second portion of the first signals in an allocated portion of a frequency band during a scheduled time of a known duration in which the communication in the first geographic region is absent.

20. The method of claim 16, wherein process the first signals and second signals, and based thereon, suppressing any of the interference includes:

calculating one or more beam weights based on the first signals and second signals; and applying the beam weights to at least the portion of the first signals carrying the communication.

21. The satellite of claim 1, wherein the onboard beamformer being configured to produce the plurality of spot beams includes being configured to adjust paths to elements of the feed array according to one or more beam weights, and wherein the feeder-link antenna being configured to transmit the first signals and second signals includes being configured to transmit the first signals and second signals to the ground base station that is configured to calculate one or more beam weights based on the first signals and second signals, and apply the one or more beam weights so calculated to at least the portion of the first signals carrying the communication.

* * * * *